(12) United States Patent
Soulier et al.

(10) Patent No.: US 9,755,474 B2
(45) Date of Patent: Sep. 5, 2017

(54) VERSATILE COOLING HOUSING FOR AN ELECTRICAL MOTOR

(71) Applicants: Nicolas Soulier, Fontaine Bellenger (FR); Sebastien Ferrari, Asnières-sur-Seine (FR); Stephane Lafon, Rouvray (FR); Alexandre Moureaud, Asnières-sur-seine (FR)

(72) Inventors: Nicolas Soulier, Fontaine Bellenger (FR); Sebastien Ferrari, Asnières-sur-Seine (FR); Stephane Lafon, Rouvray (FR); Alexandre Moureaud, Asnières-sur-seine (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 183 days.

(21) Appl. No.: 14/555,742

(22) Filed: Nov. 28, 2014

(65) Prior Publication Data
US 2015/0145356 A1 May 28, 2015

(30) Foreign Application Priority Data
Nov. 27, 2013 (EP) .................................... 13306622

(51) Int. Cl.
*H02K 5/18* (2006.01)
*H02K 9/19* (2006.01)
*H02K 9/14* (2006.01)

(52) U.S. Cl.
CPC .................. *H02K 5/18* (2013.01); *H02K 9/14* (2013.01); *H02K 9/19* (2013.01)

(58) Field of Classification Search
CPC ............... H02K 5/18; H02K 9/19; H02K 9/14
USPC ................................................ 310/52, 54, 64
See application file for complete search history.

(56) References Cited

U.S. PATENT DOCUMENTS

| | | | | |
|---|---|---|---|---|
| 1,803,570 | A * | 5/1931 | Wilhelm | H02K 5/20 310/62 |
| 5,019,737 | A * | 5/1991 | Bruno | F28F 1/16 310/52 |
| 5,331,238 | A * | 7/1994 | Johnsen | H02K 1/185 310/216.049 |
| 5,869,912 | A * | 2/1999 | Andrew | H02K 1/20 310/52 |
| 7,009,317 | B2 * | 3/2006 | Cronin | H02K 9/19 310/52 |
| 7,030,520 | B2 * | 4/2006 | Takenaka | B60K 1/00 310/64 |
| 7,663,272 | B2 * | 2/2010 | Oyoung | H02K 5/20 310/54 |
| 7,675,209 | B2 * | 3/2010 | Masoudipour | H02K 5/20 310/57 |

(Continued)

FOREIGN PATENT DOCUMENTS

EP 1077522 A1 2/2001

*Primary Examiner* — John K Kim
(74) *Attorney, Agent, or Firm* — Bryan Peckjian; SKF USA Inc. Patent Dept.

(57) ABSTRACT

An electrical device comprising a housing having cooling fins located in a central portion along an exterior surface of the housing and a laminated magnetic stack disposed within the housing and interfacing with an interior surface of the housing at the central portion. The cooling fins are configured alternatively higher and smaller on an inlet manifold and in opposition on an outlet manifold.

9 Claims, 1 Drawing Sheet

(56) References Cited

U.S. PATENT DOCUMENTS

| | | | |
|---|---|---|---|
| 8,399,118 B2* | 3/2013 | Gadawski | H01M 2/0212 |
| | | | 429/120 |
| 8,492,952 B2* | 7/2013 | Bradfield | H02K 1/20 |
| | | | 310/216.011 |
| 2002/0063328 A1* | 5/2002 | Baek | H01L 23/467 |
| | | | 257/706 |
| 2004/0000821 A1* | 1/2004 | Ciciliani | H02K 9/04 |
| | | | 310/52 |
| 2008/0030086 A1 | 2/2008 | Noda | |
| 2009/0065178 A1* | 3/2009 | Kasezawa | H01L 23/473 |
| | | | 165/104.19 |
| 2009/0200878 A1 | 8/2009 | Walter | |
| 2009/0284087 A1 | 11/2009 | Takahashi et al. | |
| 2011/0304226 A1* | 12/2011 | Bradfield | H02K 5/18 |
| | | | 310/52 |
| 2012/0080965 A1* | 4/2012 | Bradfield | H02K 1/20 |
| | | | 310/58 |
| 2015/0145356 A1* | 5/2015 | Soulier | H02K 5/18 |
| | | | 310/54 |

* cited by examiner

VERSATILE COOLING HOUSING FOR AN ELECTRICAL MOTOR

CROSS REFERENCE TO RELATED APPLICATION

This is a National Stage application claiming the benefit of European Patent Application Number EP13306622 filed on 27 Nov. 2013 (27 Nov. 2013), which is incorporated herein by reference in its entirety.

TECHNICAL FIELD

The present invention relates to the field of electrical machines and more particularly to a cooling housing for an electrical motor that can be used indifferently for gas or liquid cooling.

PRIOR ART

Classically, the increase of power of electrical motors (with the same active length) leads to modify the cooling of the statoric parts from gas (particularly air) to liquid (particularly water) cooling. This evolution requires huge modifications of the statoric parts in particular in the inlet and outlet manifolds of the liquid cooling. Moreover, additional seals are necessary to avoid internal liquid leakages and a modification of the cooling circuit to increase the efficiency of the liquid flow (alternative counter flow for example).

So, up to now a complete redesign of the statoric parts is required to modify the fluid used by the cooling.

SUMMARY OF THE INVENTION

The object of the present invention is to overcome these disadvantages of the prior art by using same statoric parts for a gas or liquid cooling.

The invention achieves these goals with a housing for an electrical device comprising an interior surface configured to interface in a central portion with a laminated magnetic stack of the electrical device and an exterior surface comprising in the central portion cooling fins, wherein the cooling fins are alternatively higher and smaller on an inlet manifold and in opposition on an outlet manifold.

With this versatile configuration, the cooling type decision on each motor unit must be taken at a very last stage of the manufacturing process (customer's system assembly) and consequently, it induces improved logistics and production costs.

For a liquid cooling system, the housing comprises a cover plate having an inlet hole and an outlet hole and which rests on the higher cooling fins in order to create a liquid cooling path between higher and smaller cooling fins from the inlet hole to the outlet hole.

Preferably, the cover plate is affixed to the housing by a fixing element and seals are fitted between the cover plate and the housing for isolating the liquid cooling and the cooling fins are realised by sand casting such that the surface roughness of the exterior surface is well adapted for heat exchanges.

The invention also concerns an electrical device comprising a housing having cooling fins located in a central portion along an exterior surface of the housing and a laminated magnetic stack disposed within the housing and interfacing with an interior surface of the housing at the central portion, wherein the cooling fins are alternatively higher and smaller on an inlet manifold and in opposition on an outlet manifold.

Advantageously, the housing comprises a cover plate having an inlet hole and an outlet hole and which rests on the higher cooling fins in order to create a liquid cooling path between higher and smaller cooling fins from the inlet hole to the outlet hole or, in order to create a gas cooling flow, the housing is directly connected with inlet and outlet manifolds.

BRIEF DESCRIPTION OF THE DRAWINGS

The invention will be better understood in view of the following detailed description, accompanied by illustrative and non-limiting examples with regard to the accompanying drawings, in which.

DETAILED DESCRIPTION

Figure 1:
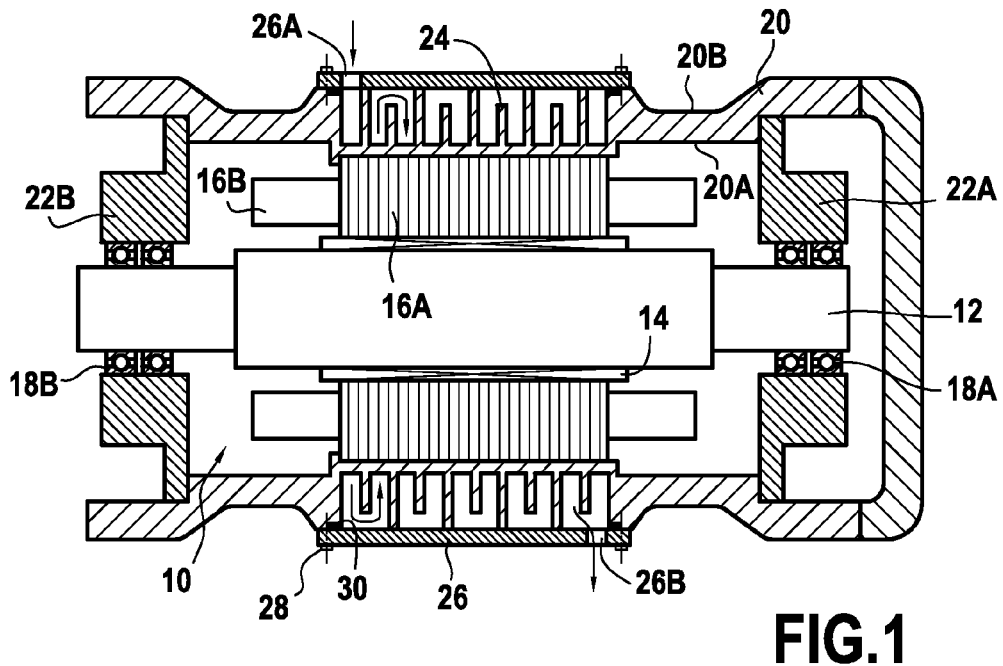
FIG. 1 is a longitudinal section view schematically illustrating an electrical motor having an outer housing which allows liquid cooling according to an embodiment of the invention.

FIG. 1 is a longitudinal section view schematically illustrating one embodiment of an electrical device such as a motor having an outer housing which allows liquid cooling according to the invention.

Basically, an electrical motor 10 comprises a rotatable shaft 12 a part of which forms a rotor 14 having at least a magnetic portion surrounded by a stator 16. The rotatable shaft is supported at each end by bearings 18A, 18B, for example rolling bearing as illustrated or magnetic bearings. The stator is disposed within an outer housing 20 of the motor and comprises a laminated magnetic stack 16A surrounded by a windings 16B and disposed along a periphery of the rotor to define an annular air gap therebetween. More particularly, the laminated magnetic stack abuts against a central portion of the outer housing 20 which also extends on either side to enclose the other components of the motor. Furthermore, transverse walls 22A, 22B close the outer housing on each side of the rotatable shaft and also form internal supports for the bearings.

According to the invention, the outer housing 20 which has an interior surface 20A configured in its central portion to interface with the laminated magnetic stack 16A of the electrical motor comprises in the central portion an exterior surface 20B having not constant cooling fins 24. More particularly, the cooling fins have alternatively high and small height, all the high cooling fins having a same height and all the small cooling fins having the same height. A cover plate 26 is affixed to the outer housing 20 by a fixing element 28 such as bolts or screws and seals 30 are fitted between the cover plate and the outer housing for isolating the liquid cooling.

By resting on the higher cooling fins, the cover plate creates a cooling path (as illustrated by the arrows) between higher and smaller cooling fins from an inlet hole 26A (receiving the liquid cooling from an inlet manifold not shown) to an outlet hole 26B (delivering the liquid cooling to an outlet manifold not shown), all pierced in the cover plate. For creating this cooling path, alternatively higher and smaller cooling fins on the inlet manifold are in opposition on the outlet manifold.

The outer housing with its cooling fins is preferably realised by sand casting (it means that the internal cooling system is leak free and the surface roughness is well adapted for heat exchanges).

The operation of an electrical motor is known and will not be explained in detail. Classically, during operation rotor 14 rotates with rotatable shaft 12 within stator 16, so that the annular air gap is maintained between the two components to form part of a closed magnetic flux path. An excitation current in the windings creates a magnetic force to drive the magnetic flux which attracts rotor 14 toward the stator 16, according to well-known principles of magnetism, and tends thus to urge the rotor to create a working torque output.

The cooling is processed during the operation of the motor. An inlet manifold drives the liquid cooling flow from a liquid entry pipe (not shown) into the outer housing via the inlet hole 26A. This flow of liquid cooling circulates around the electrical motor and leaves by the outlet hole 26B in the outlet manifold.

Figure 2:
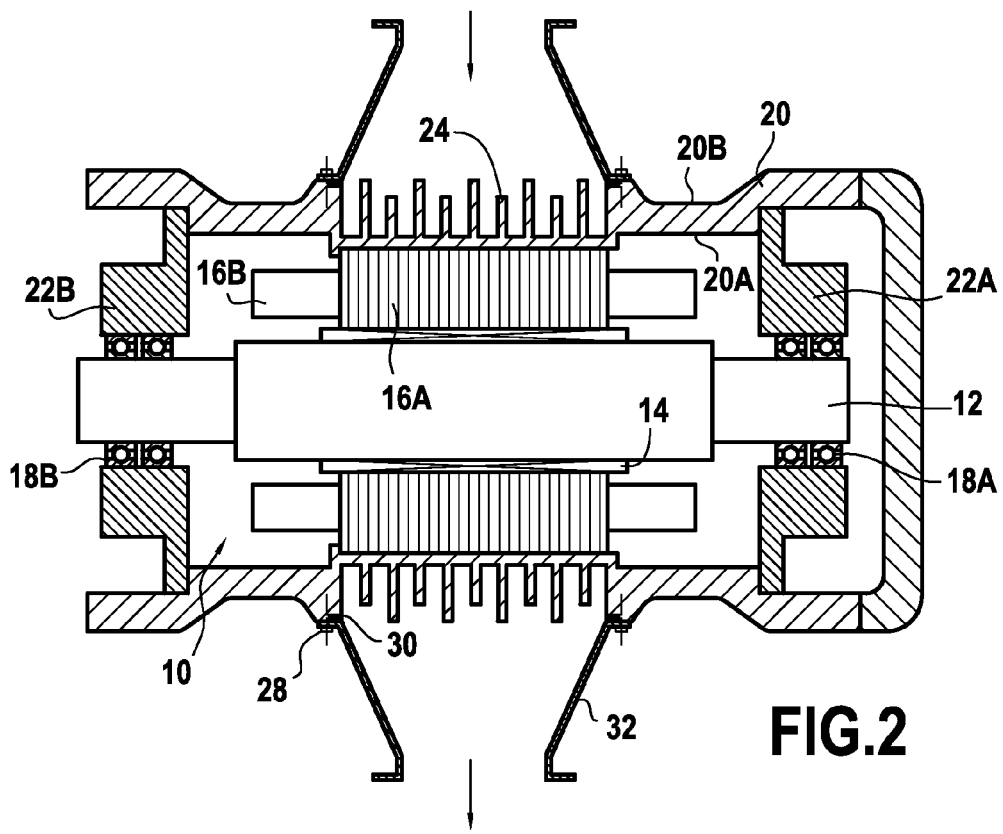
FIG. 2 is a longitudinal section view schematically illustrating the same electrical motor having a same outer housing which allows gas cooling according to another embodiment of the invention.

FIG. 2 shows another embodiment of an electrical motor having an outer housing according to the invention which allows gas cooling.

The different components of the electrical motors are the same and so not described one more time. They naturally have the same references. The outer housing (inlet and outlet) for the gas or liquid cooling are the same too. The only difference concerns the manifolds which are specific for gas and liquid cooling. More particularly, the cover plate 20 of the liquid cooling system is not present in the gas cooling system and the outer housing is directly connected with the inlet and the outlet manifolds 32. As illustrated, the inlet manifold drives the gas cooling flow from blower (for example but not shown) to the outer housing, circulates around the motor and leaves by the outlet manifold. This structure realizes a leak free mechanical interface between the gas blower and the housing of the motor as that realized between the liquid entry pipe and the housing in the liquid cooling system.

With the invention, a common design is possible for several level of power of the electrical motor (no redesign of the outer housing is required except the two manifolds of the cooling device). Such versatile configuration allows easily changing the cooling media (air/water) and subsequently the reachable power of the motor.

Although preferred embodiments have been shown and described, it should be understood that any changes and modifications may be made therein without departing from the scope of the invention. More particularly, if the invention has been described through an electrical motor, any other electrical device (including generators, starters, alternators, etc.) with stator laminations that interface with the disclosed versatile housing is conceivable.

The invention claimed is:

1. A housing for an electrical device, the housing comprising:
    an interior surface configured to interface in a central portion with a laminated magnetic stack of the electrical device;
    an exterior surface comprising in the central portion, cooling fins, each cooling fin extending in a direction radially outward from and generally perpendicular to a rotational axis of a shaft and
    a cover plate having an inlet hole receiving a liquid cooling from an inlet manifold and an outlet hole delivering the liquid cooling to an outlet manifold,
    wherein the cooling fins are alternatively higher and smaller proximate the inlet manifold and in opposition, smaller and higher, proximate the outlet manifold, the cooling fins being spatially arranged along the rotational axis of the shaft,
    wherein all the higher cooling fins have a same height,
    wherein the cover plate rests on and is supported by the higher cooling fins,
    wherein the cover plate and the cooling fins create a liquid cooling path between the alternating higher cooling fins and the smaller cooling fins from the inlet hole to the outlet hole, the liquid cooling path passing the liquid cooling from a first of the cooling fins, in a pathway formed between alternating cooling fins along a length of the rotational axis to a last of the cooling fins.

2. The housing of claim 1, wherein the cover plate is affixed to the housing by a fixing element and seals, which are fitted between the cover plate and the housing for isolating the liquid cooling.

3. The housing of claim 1, wherein the cooling fins are realized by sand casting such that the surface roughness of the exterior surface is well adapted for heat exchanges.

4. The electrical device of claim 1, wherein all the smaller cooling fins have a same height.

5. An electrical device, comprising:
    a housing having:
        cooling fins located in a central portion along an exterior surface of the housing, each cooling fin extending in a direction radially outward from and generally perpendicular to a rotational axis of a shaft,
        a cover plate having an inlet hole receiving a liquid cooling from an inlet manifold and an outlet hole delivering the liquid cooling to an outlet manifold; and
    a laminated magnetic stack disposed within the housing and interfacing with an interior surface of the housing at the central portion,
    wherein the cooling fins are alternatively higher and smaller proximate the inlet manifold and in opposition, smaller and higher, proximate the outlet manifold, the cooling fins being spatially arranged along the rotational axis of the shaft,
    wherein all the higher cooling fins have a same height,
    wherein the cover plate rests on and is supported by the higher cooling fins,
    wherein the cover plate and the cooling fins create a liquid cooling path between the alternating higher cooling fins and the smaller cooling fins from the inlet hole to the outlet hole, the liquid cooling path passing the liquid cooling from a first of the cooling fins, in a pathway formed between alternating cooling fins along a length of the rotational axis to a last of the cooling fins.

6. The electrical device of claim 5, wherein said cover plate is affixed to the housing by a fixing element and seals, which are fitted between the cover plate and the housing for isolating the liquid cooling.

7. The electrical device of claim 5, further comprising one of the following devices: a motor, a generator, a starter, and an alternator.

8. The electrical device of claim 5, wherein all the smaller cooling fins have a same height.

9. The electrical device of claim 5, wherein the cooling fins are realized by sand casting such that the surface roughness of the exterior surface is well adapted for heat exchanges.

* * * * *